Patented Feb. 13, 1923.

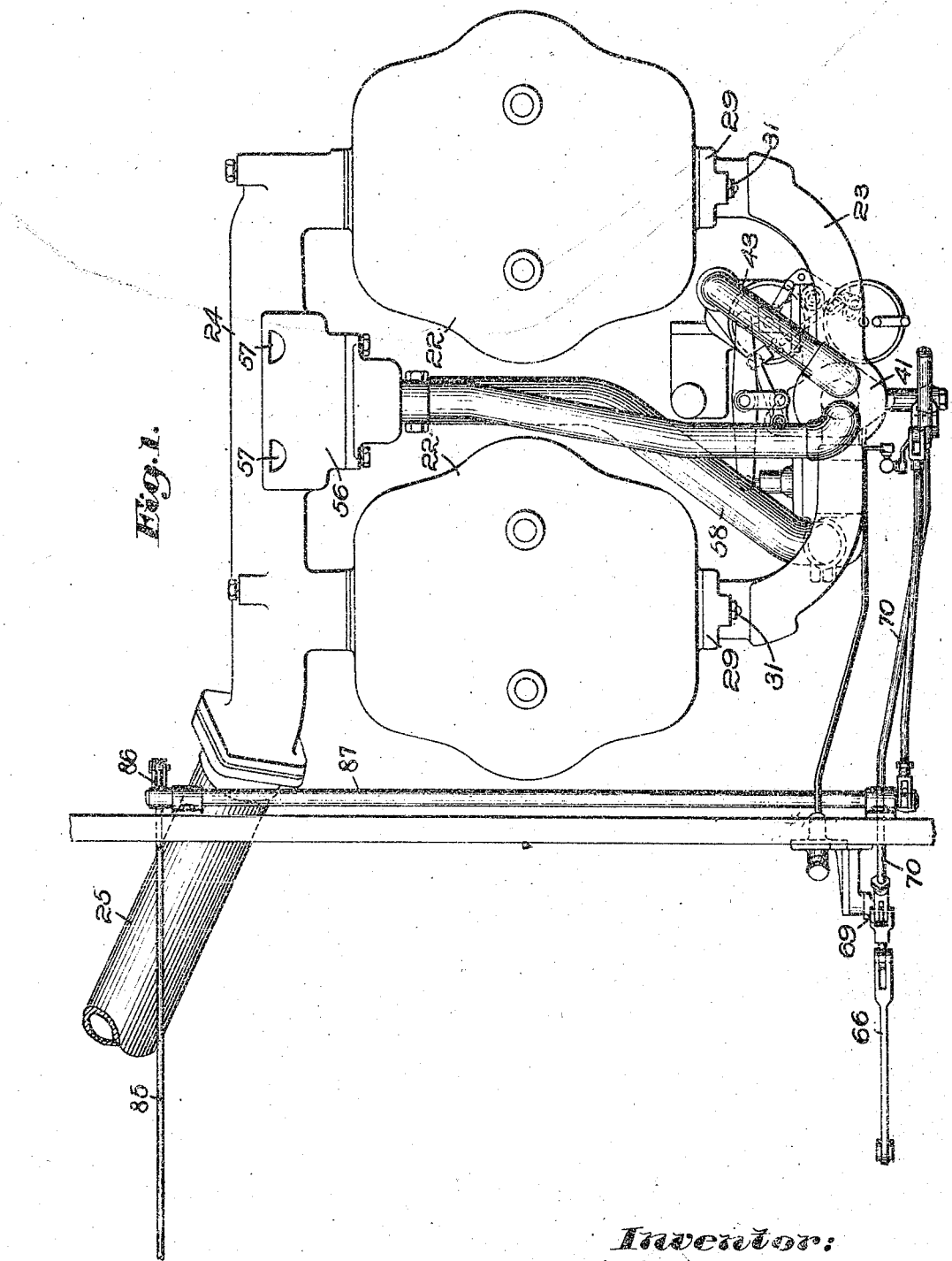

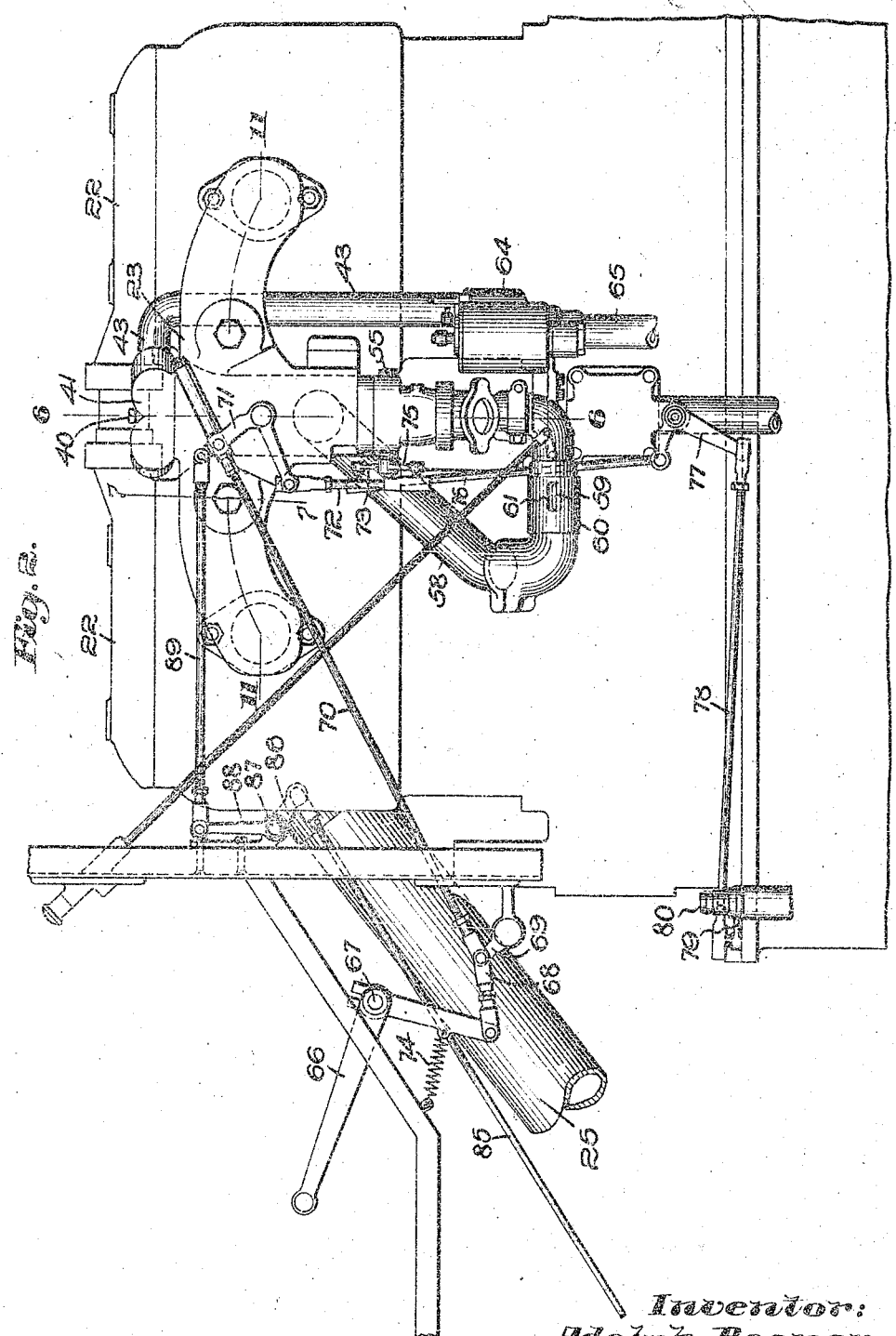

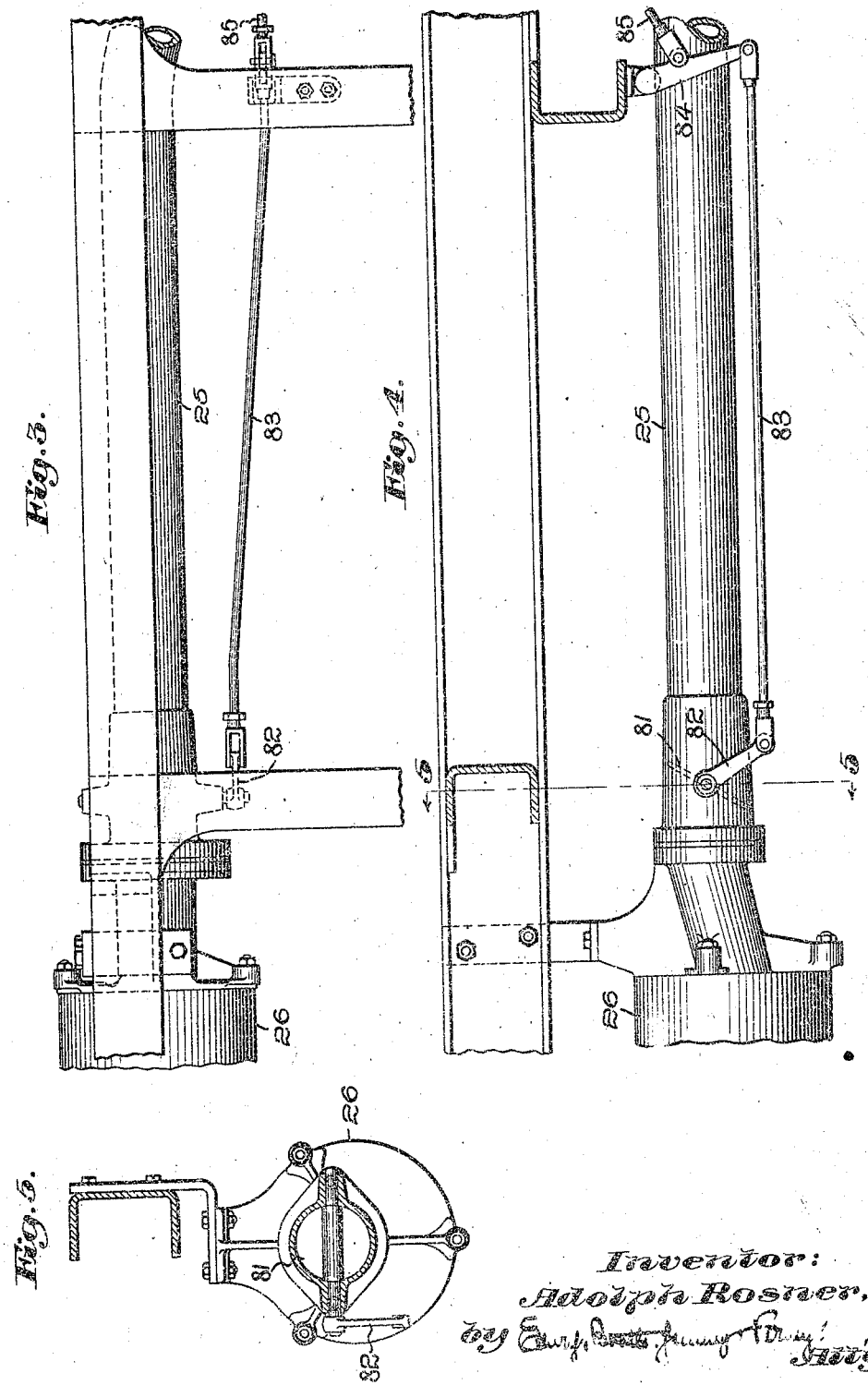

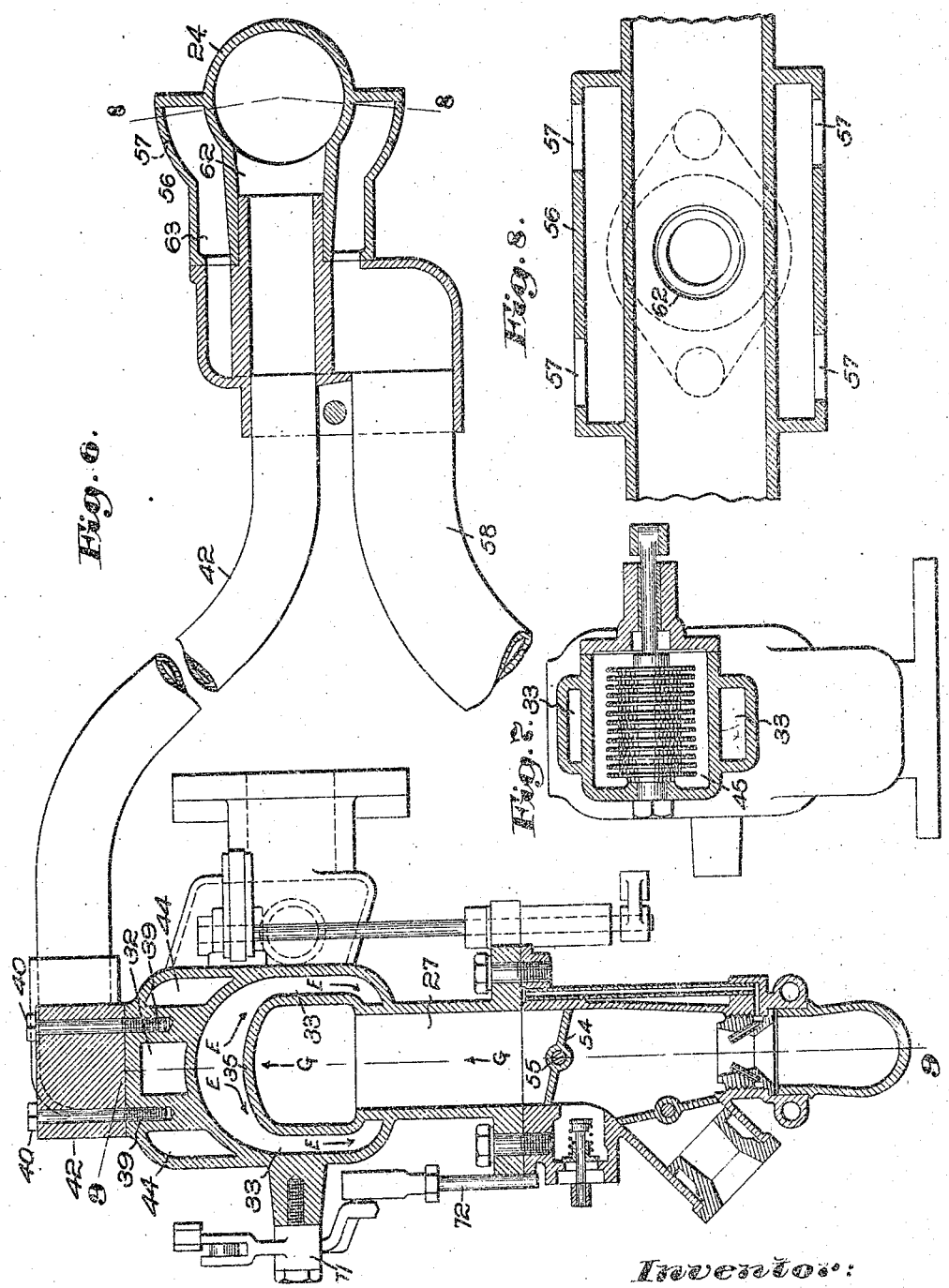

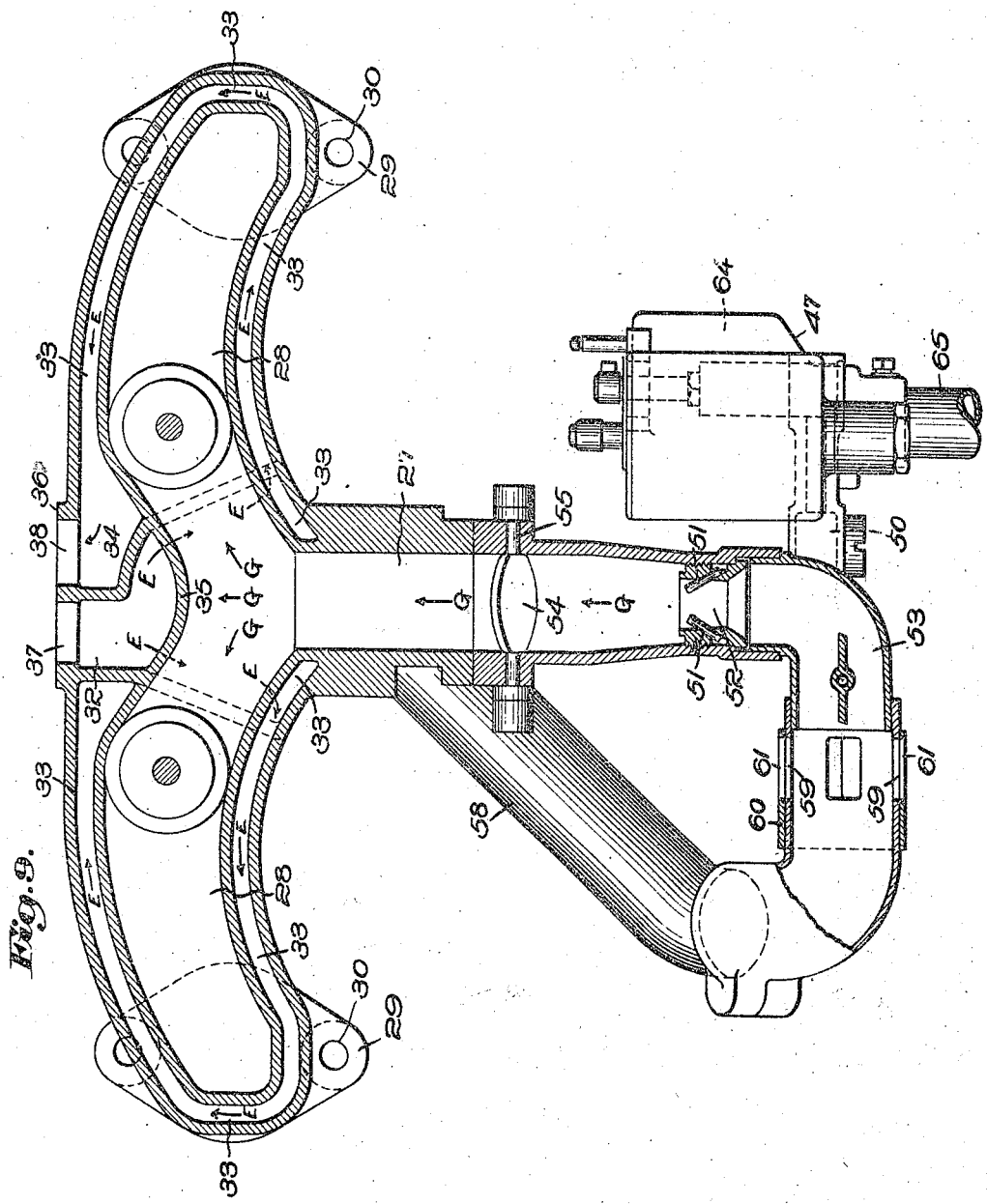

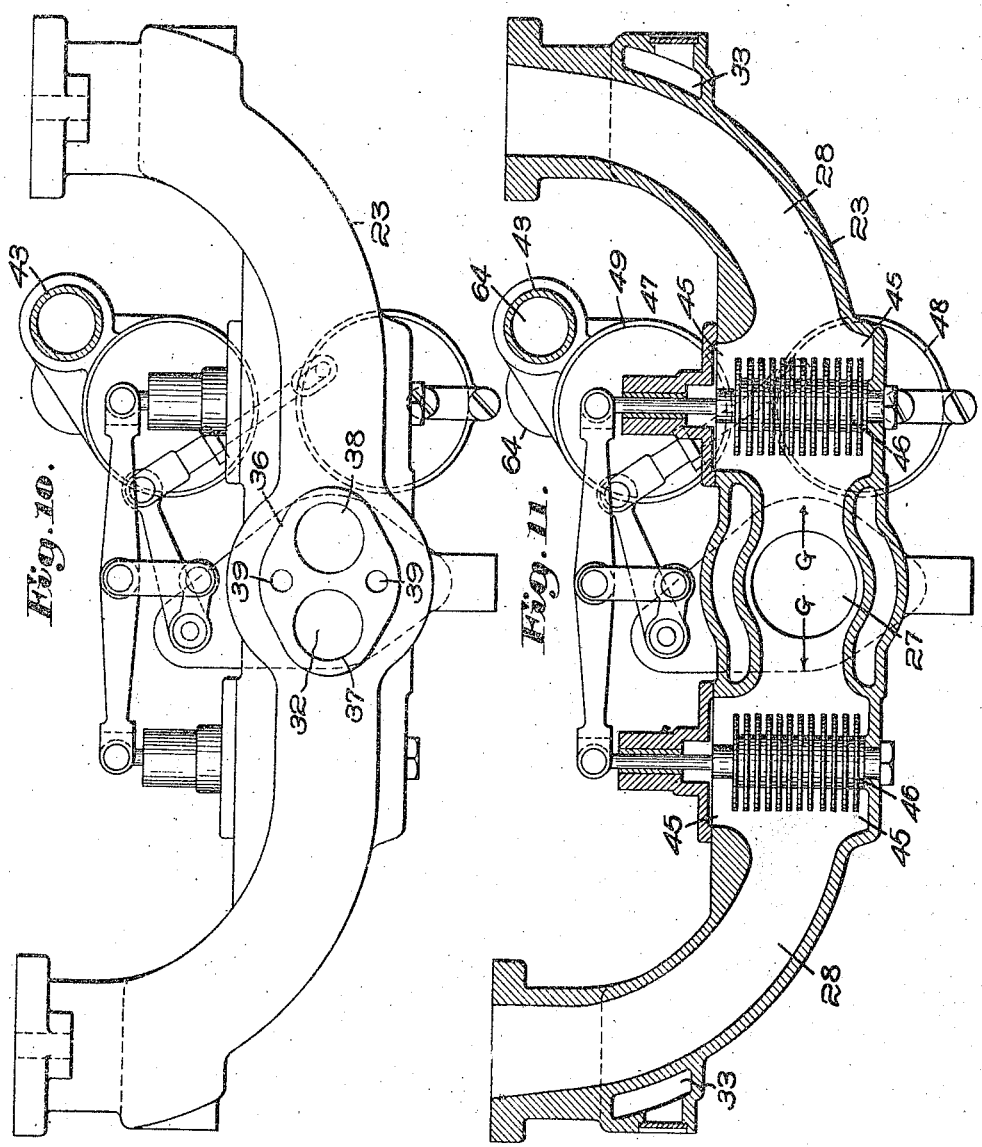

1,444,852

UNITED STATES PATENT OFFICE.

ADOLPH ROSNER, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

FUEL SYSTEM FOR INTERNAL-COMBUSTION ENGINES.

Application filed March 30, 1918. Serial No. 225,787.

*To all whom it may concern:*

Be it known that I, ADOLPH ROSNER, a citizen of the United States, and a resident of Bridgeport, in the county of Fairfield and State of Connecticut, have invented an Improvement in Fuel Systems for Internal-Combustion Engines, of which the following description, in connection with the accompanying drawings is a specification, like characters on the drawings representing like parts.

This invention relates to heating systems deriving heat from internal combustion engines, and using the same to perform some heating function, and is more especially, though not exclusively, concerned with a fuel system in which the heat of the exhaust is utilized to heat the air, liquid fuel and combustible mixture, provision being made for the control of the amount of heat applied in accordance with the particular conditions under which the engine is operated.

My invention will be best understood by reference to the following description, when taken in connection with the accompanying drawings of one specific embodiment thereof, while its scope will be more particularly pointed out in the appended claims.

In the drawings:

Fig. 1 is a plan of an internal combustion engine equipped with a fuel system embodying my invention, a portion only of the latter being illustrated in this view;

Fig. 2 is a side elevation of the parts shown in Fig. 1;

Fig. 3 is a plan of the remainder of the fuel system, and constitutes in effect a continuation of Fig. 1;

Fig. 4 is a side elevation of the parts shown in Fig. 3, and constitutes in effect a continuation of Fig. 2;

Fig. 5 is a sectional view on line 5—5 of Fig. 4;

Fig. 6 is a sectional view on an enlarged scale on line 6—6 of Fig. 2;

Fig. 7 is a sectional view on an enlarged scale on line 7—7 of Fig. 2;

Fig. 8 is a sectional view on line 8—8 of Fig. 6;

Fig. 9 is a sectional view on line 9—9 of Fig. 6;

Fig. 10 is a detail plan on an enlarged scale, showing the intake manifold and carburetor; and Fig. 11 is a sectional view on an enlarged scale on line 11—11 of Fig. 2.

Referring to the drawings, and to the embodiment of my invention which is illustrated therein, I have shown (see Figs. 1 and 2) an internal combustion engine of the four-cylinder type, having its cylinders cast in pairs 22—22, and receiving their supply of combustible mixture through any appropriate intake manifold, such as a manifold 23. The exhaust gases may be carried away by an exhaust manifold 24, to which is connected an exhaust pipe 25 leading to a muffler 26.

While the intake manifold may be of any usual or desired construction, I have herein shown a manifold which, per se, is not my invention, the same being provided with a fuel intake passage having an inlet trunk 27 and two branches 28, to conduct the vaporized fuel to the engine cylinders 22, to which the manifold may be secured in any suitable manner, as by providing the same with flanges 29, having holes 30 to receive usual studs 31. The mixture of air and fuel, drawn from the carburetor hereinafter described into the inlet trunk 27, flows through the branches 28 to the engine cylinders in streams whose directions are indicated by the several arrows G in Figs. 6, 9 and 11.

In the use of the grades of gasoline now being supplied, and more especially in cases where it is attempted to use kerosene or distillate as a fuel, much difficulty is experienced, owing to the fact that the vaporized fuel has a strong tendency to condense. Some of the liquid fuel is deposited in the intake passages, and some is carried even into the cylinders. This is attended by several undesirable results, including the rapid formation of carbon deposits, to say nothing of the lack of economy and the difficulties had with the proper functioning of the engine. These troubles are too well-known to require further description.

In the intake manifold selected for illustration, there is provided a heating fluid passage adapted to receive some suitable hot fluid, such for example as the exhaust from the engine. This stream of heating fluid is conducted in proximity to the fuel passages, and in such a manner as to secure the best possible results. In the present example, I have shown a heating fluid passage having a trunk 32 (see Figs. 9 and 10), and two branches 33 leading therefrom. Preferably, the inlet trunk 32 for the heating fluid is adjacent the inlet trunk 27 for the combustible mixture, and preferably, one trunk leads in the opposite direction with respect to the other. In the present example, the arrangement is such that the heating fluid is brought into the manifold transversely of the branch passages 28 of the fuel conduit, and is then conducted about the incoming stream of gaseous fluid through the use of a chamber 34, which, in turn, communicates with the branches 33.

Thus I have provided at this point where the fuel enters and is divided into two streams what is known as a "hot spot", at which the heat is concentrated just as the mixture of vaporized fuel and air leaves the carburetor. It should here be noted that, at the lower part of the chamber 34, where the inlet trunk 32 delivers the hot exhaust, said chamber is provided with a wall 35, extending in general direction transversely of the entering stream of hot exhaust, as well as transversely of the stream of vaporized fuel and air which enters the fuel intake trunk 27. Thus it should be evident that both streams impinge in opposite directions upon opposite surfaces of the wall 35, thus perfecting the vaporization of the hydro-carbon, which is more or less in a condition of a fog mixture when it strikes the surface.

By reference to Fig. 9, it will be observed that the branches 33 lead from the chamber 34 in a downward direction about the sides of the fuel conduit to a point beneath the branches of the latter, and then longitudinally of and beneath said branches. By this means, any liquid fuel gravitating to the bottom of the fuel passage is subjected to the heating effect of the stream of hot exhaust therebeneath, and is re-vaporized. The branches 33 lead then in an upward direction transversely of the branches 28, as best shown at the extreme right and left-hand ends of Fig. 9, and then above and longitudinally of the branches 28, and in the opposite direction, as best shown in the upper portion of Fig. 9. Thus it is evident that the stream of heating fluid is conducted first transversely, then lengthwise of and in the same direction as the stream of gaseous fuel, and then lengthwise of and in the opposite direction, passing first beneath the fuel passage and then above. By this means the best effect is secured, since the greatest heat of the exhaust gas is applied where it is most needed, and after it has become somewhat cooled is carried along the upper portion of the fuel conduit, where less heat is needed. The direction of flow of the exhaust gas is indicated by the several arrows G in Figs. 6 and 9.

Any suitable provision may be made for connecting the heating fluid passages to suitable conduits to conduct the heating fluid to and from the manifold, but in the present example, I have provided the latter with a boss 36, best shown in Figs. 9 and 10, having an opening 37 for the entrance, and an opening 38 for the exit of said fluid. Herein this boss is provided with threaded openings 39, to receive studs 40, by means of which the manifold may be secured to a header 41, to which are connected conduits 42 and 43. It should here be observed, by reference to Figs. 9 and 10, that the branches 33 come together at a point adjacent the outlet orifice 38, and that one branch is subdivided as at 44 (see Fig. 6) into two branches, which lead past the trunk 32. In Figs. 7 and 11, the branches 28 are somewhat enlarged, as at 45, to form chambers for thermostats 46, which are disposed in the path of the gaseous fuel on opposite sides of the inlet trunk 28, and in positions best calculated to provide for their use in controlling the supply of fuel, such control, however forming no part of my invention.

As a means for supplying a combustible mixture to the intake manifold, I have herein shown a carburetor 47, which, per se, forms no part of my invention, and which it is unnecessary here to show or to describe in detail, except that it may be noted that the carburetor selected for illustration is one of the type using two fuels, one a highly-explosive hydro-carbon, such as gasoline, and the other a heavier and less-explosive hydro-carbon, such as kerosene or distillate. To this end, the carburetor selected for illustration is provided with two usual and well-known float chambers 48 and 49, either of which is adapted to deliver liquid fuel through a passage 50, leading to one or more nozzles 51, which deliver streams of atomized fuel into the throat of a Venturi tube 52, as best shown in Fig. 9. It is unnecessary here to describe the remaining details of the carburetor, since they have nothing whatever to do with my present invention, it being understood that the engine operates in a usual and well-known manner to draw air through an intake passage 53, and through the Venturi tube 52 into the mixing chamber thereabove, whence it is delivered into the intake manifold under the control of a suitable throttle valve 54, herein of the well-known butterfly type, having a stem 55.

Preferably, the air supply to the intake passage 53 is heated by some appropriate means, such as a stove 56 best shown in Fig. 6, herein formed as a part of the exhaust manifold 24, and having a plurality of openings 57, best shown in Fig. 8, through which atmospheric air is taken, heated by the walls of the stove, and delivered through a suitable conduit 58, through the intake passage 53, as best shown in Fig. 9. If desired, the conduit 58 may be provided with one or more ports 59, best shown in Fig. 9, for the admission of cold air, which may be regulated by a usual valve 60, having similar ports 61.

Referring again to the pipe 42 (see Fig. 6), hereinbefore described, which is used to conduct exhaust gas to the intake manifold to heat the latter, said pipe may be connected to the exhaust manifold 24 in any appropriate manner, but I have herein provided a stove 56 with an inner passage 62 and an outer surrounding passage 63. The inner passage provides a means of communication between the exhaust manifold 24 and the pipe 42, while the surrounding passage 63 provides a way of communication between the inlet ports 57 and the pipe 58. By this means, the hot gases passing through the passage 62 into the pipe 42 leading to the intake manifold, heat the incoming air in the surrounding passage 63 before such air passes through the pipe 58 to the intake of the carburetor. It should now be evident that I have provided a means for heating not only the air which is taken in to form the mixture, but the mixture itself after it leaves the carburetor and passes through the intake manifold into the engine.

After the exhaust gas has been utilized to heat the intake manifold, it is cooled to a considerable extent, and if desired it can then be led through the hereinbefore described pipe 43 to a point adjacent the float chamber 49, to raise the temperature of the latter to facilitate its carburetion. To this end, I have herein provided the carburetor with a fuel heating chamber 64, best shown in Figs. 10 and 11, adjacent and preferably integral with the float chamber 49. Into this chamber, the partially cooled exhaust gases are delivered by the pipe 43, and thus come in contact with a relatively small area of the wall of the float chamber 49, after which they are conducted from the chamber 64 by a pipe 65, which may lead to any suitable point. Thus it is evident that means for heating the liquid fuel, as well as the atmospheric air and combustible mixture, is provided, thereby ensuring the formation of a comparatively stable gas, which has no opportunity to condense, because it is heated up to the point where it enters the engine.

Now it must be evident that, in a system of this kind, when the engine is operated at high speed or under a heavy load and with a comparatively wide throttle opening, the engine generates more heat than is the case when the engine is running at a slower speed and under a lighter load, especially when it is idling. This difference is well illustrated by the difference between the conditions which obtain when a motor vehicle is ascending a grade, as compared with those which exist when the vehicle is descending, especially as in the latter case the engine is usually idling, but the forward motion of the vehicle, due to the down grade, produces a more or less rapid cooling effect. It is obvious that, unless special provision is made, the fuel system will receive too much heat when the engine is running under heavy load or at high speed, and not enough when it is running under light load or at low speed. To the end that these difficulties may be avoided, I have provided inter-connecting means between the fuel-throttling means and the fuel-heating means to cause a decreased heating effect accompanying an increased fuel supply, on the one hand, and an increased heating effect accompanying a decreased fuel supply, on the other hand, as I shall now describe.

In connection with fuel systems for internal combustion engines, it is customary to provide a manually-operable throttle-controlling lever, and a foot-operated throttle-controlling lever, the latter being commonly called the accelerator pedal, both of which levers are connected by suitable mechanism to the throttle valve in such a manner that either may be availed of for the control of the valve. In the present example, I have omitted any showing of the manually-operable lever, but in Figs. 1 and 2, I have shown a common form of accelerator pedal 66, fulcrumed at 67, and connected to the throttle valve stem 55 by suitable connections, including a link 68, an arm 69, a link 70, a bell-crank lever 71, a link 72, and an arm 73, the latter being secured to the valve stem. The arrangement is such that pressure of the foot in a downward direction on the pedal 66 causes the throttle valve to open, while the latter is closed by a usual spring 74, herein connected at one end to the pedal, and at its other end to a suitable fixed point. The manual control, as herein partially illustrated, includes an arm 75, secured to the throttle valve stem 55, and connected by a link 76, bell-crank lever 77, link 78, and arm 79, to a rockshaft 80, the latter being usually connected to the well-known manually-operable lever (not shown), which is customarily mounted on the steering column of a motor vehicle.

As a means for carrying the heating effect, I have herein provided, at a suitable point in the exhaust system an exhaust throttling valve 81 (see Fig. 4), herein located adjacent the inlet end of the muffler 26. When this valve is closed, as in Fig. 4, no way of escape of the exhaust into the muffler is provided, and hence the choking of the exhaust passage causes the exhaust to be diverted and compelled to flow from the exhaust manifold 24 (see Fig. 6) through the passage 62, pipe 42, and header 41, into and through the passages 32 and 33 of the intake manifold, and thence out again through the header 41 and through the pipe 43 into and through the chamber 64, whence it passes through the pipe 65 to the atmosphere at a suitable point. Under these circumstances, the full heating of the exhaust is utilized to heat the liquid fuel, the air and the combustible mixture.

When, however, the exhaust throttle valve 81 is open, a free escape is provided past said valve into the muffler 26, and under such circumstances, a small portion only of the exhaust gases will flow through the fuel and air heating system. It is desirable that the action of the exhaust throttle valve should be automatic, so that, without the operator giving the matter any thought, said valve shall close as the fuel throttle valve closes, and open as the fuel throttle valve opens. To this end, I have herein provided interconnecting means between the fuel throttle valve and the exhaust throttle valve. These means may take various forms, but in the present example, include an arm 82, link 83, lever 84 (see Figs. 3 and 4), link 85, arm 86, rockshaft 87, arm 88, and link 89, the latter being connected to the hereinbefore described bell-crank lever 71, which forms a part of the connections between the accelerator pedal 66 and the fuel throttle valve 54. The arrangement is such that when the fuel throttle valve opens to give an increased fuel supply, the exhaust throttle valve also opens to give a decreased heating effect, and, on the other hand, when the fuel throttle closes to decrease the fuel supply, the exhaust throttle valve also closes to increase the heating effect.

From the foregoing, it is evident that the control of the heat supplied to the fuel system is automatic, and that the heating effect is varied in accordance with the particular conditions under which the engine is operated. It follows that I have provided a means to avoid too great heating of the fuel system when the engine is operating at high speed or under heavy load, and t little heating when the engine is operating at low speed or under light load, or when it is idling.

While I have herein shown and described one form or embodiment of my invention for illustrative purposes, and have disclosed and discussed in detail the construction and arrangement incidental to one specific application thereof, it is to be understood that the invention is limited neither to the mere details or relative arrangement of parts, nor to its specific embodiment herein shown, but that extensive deviations from the illustrated form or embodiment of the invention may be made, without departing from the principles thereof.

Having thus described my invention, what I claim and desire by Letters Patent to secure is:

1. The combination with an internal combustion engine, of charge-forming means having an air inlet, an engine intake to conduct combustible mixture from said charge-forming means to said engine, a throttle valve to control the supply of combustible mixture to said engine, a main exhaust pipe leading from said engine, a branch exhaust pipe leading from said main exhaust pipe to heat the combustible mixture passing through said engine intake to said engine, a throttle valve to cause some exhaust gas to pass through each of said pipes or to cause all of the exhaust gas to pass through said branch exhaust pipe, a jacket in part about a portion of said main exhaust pipe and in part about said branch exhaust pipe and presenting an air inlet and an air outlet delivering air heated by said exhaust pipes to said air inlet of said charge-forming means, and means conjointly to control said valves.

2. The combination with an internal combustion engine, of charge-forming means having an air inlet, an engine intake to conduct combustible mixture from said charge-forming means to said engine, a throttle valve to control the supply of combustible mixture to said engine, a main exhaust pipe leading from said engine, a branch exhaust pipe in constant communication with said main exhaust pipe to heat the combustible mixture passing through said engine intake to said engine, a throttle valve to close said main exhaust pipe to a greater or less extent, a jacket in part about a portion of said main exhaust pipe and in part about said branch exhaust pipe and presenting an air inlet and an air outlet delivering air heated by said exhaust pipes to said air inlet of said charge-forming means, and means conjointly to control said valves.

In testimony whereof I have signed my name to this specification.

ADOLPH ROSNER.